C. H. DOW.
GREASE CUP.
APPLICATION FILED MAY 17, 1919.

1,370,523.

Patented Mar. 8, 1921.

Inventor:
Charles H. Dow
by Jas. H. Churchill
Atty.

UNITED STATES PATENT OFFICE.

CHARLES H. DOW, OF BOSTON, MASSACHUSETTS, ASSIGNOR OF ONE-HALF TO RUSSELL T. GREEN, OF QUINCY, MASSACHUSETTS.

GREASE-CUP.

1,370,523.   Specification of Letters Patent.   Patented Mar. 8, 1921.

Application filed May 17, 1919. Serial No. 297,883.

*To all whom it may concern:*

Be it known that I, CHARLES H. DOW, a citizen of the United States, residing in Boston, in the county of Suffolk and State of Massachusetts, have invented an Improvement in Grease-Cups, of which the following description, in connection with the accompanying drawings, is a specification, like characters on the drawings representing like parts.

This invention relates to a grease cup which is adapted for general machine use but which is especially adapted for use on motor vehicles and particularly on parts thereof which are accessible with difficulty.

The invention has for its object to provide a grease cup which is highly efficient in operation, which can be filled and applied with the least possible trouble, which provides for a free flow of relatively thick grease, is economical in the use of grease and is durable.

To this end the grease cup is provided with a cylinder or barrel open at one end and provided with a head at its opposite end, which has extended from it within the cylinder a spindle or rod angular in cross section for a portion of its length and provided with relatively coarse screw-threads on the portions of greater diameter, which engage like screw-threads on the interior of a hollow stem, which is provided with external screw-threads for attachment to the part containing the member to be lubricated.

The hollow stem has mounted on it a piston of substantially the internal diameter of the cylinder or barrel, and which for the best results is loosely mounted upon said stem so as to turn with the cylinder or barrel as will be described.

The piston is preferably constructed as will be described so as to make a grease-tight fit with the cylinder or barrel by the pressure of the grease within the cylinder, as will be described.

These and other features of this invention will be pointed out in the claims at the end of this specification.

Figure 1:
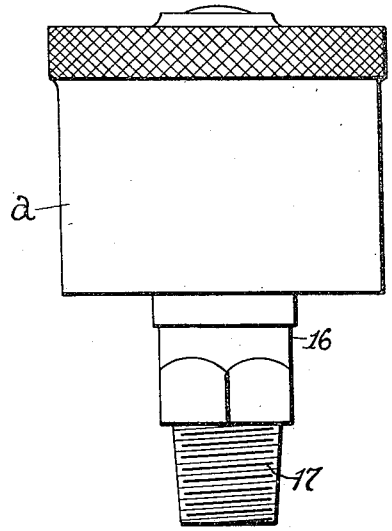

Figure 1 is an elevation of a grease-cup embodying this invention.

Figure 2:
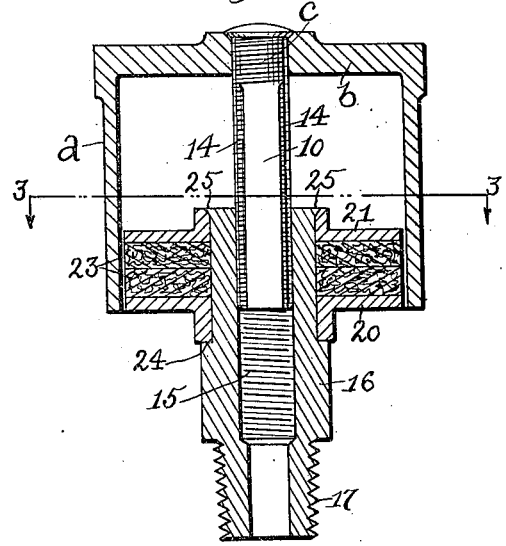

Fig. 2, a vertical section of the grease-cup shown in Fig. 1.

Figure 3:
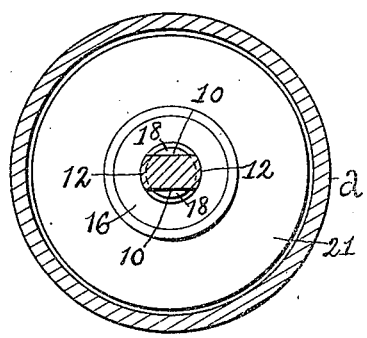

Fig. 3, a section on the line 3—3, Fig. 2, and

Figure 4:
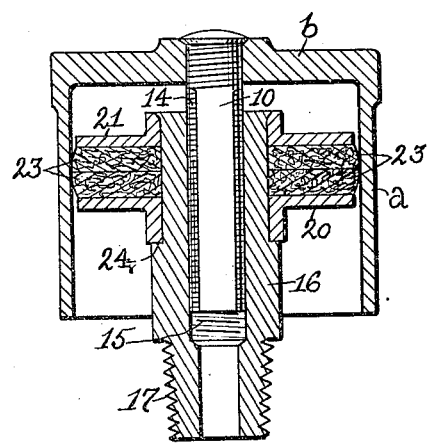

Fig. 4, a section like Fig. 2 with the cup partially turned up.

Referring to the drawings *a* represents the cylinder or barrel, which is open at one end and closed at its opposite end by the head *b*, from which is extended within the cylinder a spindle or rod *c*, centrally located and angular in cross section for a portion of its length. In the present instance, the spindle *c* is shown as a cylindrical rod having portions removed to form parallel flat faces 10 and leave other portions 12 of the rod of its full diameter, which latter portions are provided with relatively coarse screw-threads 14 which are designed to engage like threads 15 on the interior of a hollow stem 16, provided at its outer end with external threads 17 for engagement with a part containing the member to be lubricated. The flat faces 10 coöperate with the hollow stem to form grease outlet passages 18 for the cup. The hollow stem 16 has mounted upon it a piston, which is preferably made as herein shown and comprises metal washers 20, 21, and an interposed washer or washers 23 of leather or other yielding material. The piston is positioned on the hollow stem by a shoulder 24 against which the metal washer 20 bears, and by a bur or slight flange 25 at the upper end of the hollow stem which slightly overlaps the upper washer 21 as represented in Fig. 4. The metal and leather washers are made of substantially the internal diameter of the cylinder or barrel, so that when the latter is turned to force the grease out of the cylinder or barrel *a*, pressure is transmitted through the grease to the piston and the yielding member 23 thereof is expanded so as to make frictional contact with the cylinder or barrel, with the result that a tight joint between the piston and cylinder is made which prevents grease being forced out of the cylinder and wasted, and which also frictionally connects the piston with the cylinder, so that when the cylinder is turned, the piston turns with it, which is permitted by its being loosely mounted on the hollow stem 16, thereby avoiding wear upon the non-metallic member of the piston and enabling it to make and maintain the tight joint desired after long use.

In order that this feature of the invention might be clearly comprehended, the space between the piston and cylinder is shown exaggerated in Fig. 2.

By making the center spindle 16 as a solid rod, it can be provided with deep or coarse external screw-threads without weakening the same, which coarse screw-threads enable the cylinder or barrel to be quickly and easily applied to the hollow stem.

This is of decided advantage when the hollow stem is located in a place which is not easily accessible.

In operation, the cylinder or barrel is filled or substantially filled with grease and its threaded spindle c is entered into the hollow stem and engaged with the screw-threads thereof. When it is desired to eject grease through the hollow stem, the cylinder a is turned by hand and an internal pressure is immediately created on the grease, which pressure forces the non-metallic member of the piston into engagement with the cylinder, so that on further turning of the latter, the piston will turn with it, and at the same time, the cylinder will be moved in the direction of its length to force the grease into the passages 18 and out through the hollow stem 16 to the part to be lubricated.

It may be preferred to provide the spindle with opposite reduced portions 10 to form two passages, but it is not desired to limit the invention to this particular construction.

I have herein shown one construction embodying the invention, but it is not desired to limit the invention to the particular construction shown.

Claims.

1. In a grease cup, in combination, a hollow stem provided with internal screw-threads, a piston mounted to turn on said stem and provided with rigid members and with a yielding member interposed between said rigid members, and a cylinder open at one end to fit over said piston and provided with a head having extended therefrom a rigid spindle provided with screw-threads to engage the screw-threads of the hollow stem and having a reduced portion to form a grease outlet within the hollow stem and between it and the reduced portion of said spindle.

2. In a grease cup in combination, a hollow stem provided with internal screw-threads, a piston mounted on said stem, a cylinder open at one end to fit over said piston and provided with a head having extended therefrom a rigid spindle provided with screw-threads to engage the screw-threads of the hollow stem and having a reduced portion coöperating with the hollow stem to form a grease outlet passage between it and the reduced portion of said spindle.

3. In a grease cup, in combination, a hollow stem, a piston mounted to turn thereon and provided with a member capable of being expanded by pressure applied to said piston, and a cylinder open at one end to fit over the said piston and having a head provided with a threaded spindle to engage the hollow stem, said cylinder when turned causing the grease within it to expand the said piston member into engagement with the cylinder and form a tight joint and to turn therewith.

4. In a grease cup, in combination, a hollow stem, a piston mounted to turn thereon and provided with a member capable of being expanded by pressure applied to said piston, a cylinder fitted over said piston and frictionally connected with said piston to make a tight joint therewith and turn the piston when the cylinder is turned with grease therein, and means for rotatably mounting the cylinder on the hollow spindle.

5. In a grease cup, in combination, an internally threaded hollow stem provided with a piston having a member capable of being expanded by pressure of the grease applied to it, and a cylinder open at one end to fit over said piston and with which said expansible member coöperates to make a grease-tight joint, and having a head provided with a threaded rigid spindle to engage the internally threaded hollow stem.

6. In a grease cup, in combination, a threaded hollow stem, a piston thereon provided with a member capable of being expanded by pressure of the grease applied to it, and a cylinder open at one end to fit over said piston and with which said member coöperates to make a grease-tight joint when pressure of the grease is applied to said member, and having a head provided with a rigid threaded spindle to engage the threaded hollow stem and coöperating with the latter to form a grease outlet passage from said cylinder.

In testimony whereof, I have signed my name to this specification.

CHARLES H. DOW.